(12) United States Patent
Bente et al.

(10) Patent No.: US 12,546,349 B2
(45) Date of Patent: Feb. 10, 2026

(54) DEVICE FOR COMPENSATING FOR TOLERANCES

(71) Applicant: WITTE Automotive GmbH, Velbert (DE)

(72) Inventors: Jan Christian Bente, Sprockhövel (DE); Karin Sycha, Velbert (DE)

(73) Assignee: Witte Automotive GmbH, Velbert (DE)

( * ) Notice: Subject to any disclaimer, the term of this patent is extended or adjusted under 35 U.S.C. 154(b) by 269 days.

(21) Appl. No.: 18/459,480

(22) Filed: Sep. 1, 2023

(65) Prior Publication Data

US 2024/0077096 A1    Mar. 7, 2024

(30) Foreign Application Priority Data

Sep. 1, 2022 (DE) ...................... 10 2022 209 111.6
Dec. 15, 2022 (DE) ...................... 10 2022 213 688.8

(51) Int. Cl.
*F16B 5/02* (2006.01)
(52) U.S. Cl.
CPC ................................... *F16B 5/025* (2013.01)
(58) Field of Classification Search
CPC ........... F16B 35/04; F16B 39/24; F16B 37/12
See application file for complete search history.

(56) References Cited

U.S. PATENT DOCUMENTS

2015/0330435 A1* 11/2015 Schwarzbich ........ F16B 5/0283
411/16

FOREIGN PATENT DOCUMENTS

| DE | 102016106006 A1 | 10/2017 |
|---|---|---|
| DE | 102018102291 A1 | 8/2019 |
| EP | 0840021 A1 | 5/1998 |
| EP | 3064785 B1 | 11/2018 |

OTHER PUBLICATIONS

German Patent and Trademark Office, Office Action in Application No. DE 10 2022 213 688.8, dated Apr. 13, 2023, 4 pages, Munich, Germany.

* cited by examiner

*Primary Examiner* — Daniel J Wiley
(74) *Attorney, Agent, or Firm* — Marshall & Melhorn, LLC

(57) ABSTRACT

A device for compensating for tolerances between two components to be connected to one another may have a base element and a compensating element which is in threaded engagement with the base element and which can be moved from a starting position by rotation relative to the base element. The device may also have a radially yielding driving element acting in a predetermined direction, and a holding device for connecting to one of the components. The holding device is designed as an integrated part of the base element or the compensating element, or as a separate part and can be detachably arranged on one of the components in a form-fitting and/or force-fitting manner. The base element and the compensating element are nested in such a way that at least two coupling interfaces are formed between the base element and the compensating element.

19 Claims, 13 Drawing Sheets

DEVICE FOR COMPENSATING FOR TOLERANCES

FIELD

The invention relates to a device for compensating for tolerances between two components to be connected to one another.

BACKGROUND

Such a tolerance compensation device is basically known and is used, for example, in vehicle construction—in particular, when two components need to be bolted together across a tolerance-affected joint gap. For this purpose, the tolerance compensation device is arranged between the components to be connected, and a screw element for screwing the components, e.g., a screw or threaded bolt, is passed through correspondingly provided openings and through the tolerance compensating device. When screwing the screw element, the compensating element is rotated relative to the base element by means of a driving spring connected between the screw element and the compensating element and is accordingly moved from its starting position axially to the base element, e.g., it is moved out of the base element until it reaches its compensating position, in which the base element and the compensating element each lie against one of the components and accordingly bridge the joint gap.

SUMMARY

The object of the present invention is to specify a device, improved in relation to the prior art, for compensating for tolerances between two components to be connected to one another.

With regard to the device, the object is achieved according to the invention by the features specified in the claims.

A first embodiment of the device according to the invention for compensating for tolerances between two components to be connected to one another comprises at least one base element and a compensating element, which is in threaded engagement with the base element and which is movable from an initial position by rotation relative to the base element, wherein the base element and the compensating element are placed one inside the other in such a way that at least two, in particular three, coupling interfaces are formed between the base element and the compensating element.

The device enables a nested construction with the same compensation path and comparatively smaller, for example flatter, design.

The advantages achieved with the invention consist in particular in that the device can be formed comparatively small and compact with such a nested arrangement of the base element and the compensating element, wherein a load-bearing capacity of the device can remain comparatively uniform or even be increased. In addition, no compensation path, in particular tolerance compensation path, for the device must be shortened in order to achieve a comparatively smaller and more compact construction of the device.

The additional load-bearing capacity, which is provided by the at least two, in particular three, coupling interfaces and/or by the at least two, in particular three, thread engagements, can be used to achieve high strengths, for example when using materials other than metal. Known tolerance compensation systems are made from metal. The at least two coupling interfaces are formed at different regions between the base element and the compensating element. For example, the at least two coupling interfaces can extend substantially parallel and at a distance from one another. In one embodiment with three coupling interfaces, all three coupling interfaces can be arranged parallel and at a distance from one another.

Due to the nested design of the device, the compensating element and/or the base element can be made from plastic. Plastic enables a simplified production method and production process as well as cost savings. Furthermore, the compensating element and/or the base element can be designed to be comparatively lighter.

The device is, for example, a tolerance compensation device, in particular for compensating for tolerances when a component is fastened to a component using a bore or a blind hole. Tolerance compensation devices are part of fastening elements for fastening components and parts to one another, for example, in motor vehicles. For example, such tolerance compensation devices are pressed into one of the components. In particular, the device is an automatic tolerance compensation system.

In one possible embodiment, the compensating element is arranged on a first end face of the base element. The compensating element can be adjusted between two components relative to the base element to compensate for tolerances. The compensating element is arranged on the first end face of the base element, i.e. viewed in the axial direction of the base element. The compensating element can be arranged so as to be axially movable relative to the base element.

The compensating element can be designed as a hollow cylindrical compensating element, which is or can be brought into threaded engagement with a base element and can be moved axially from the initial position into a compensating position by rotating relative to the base element.

For example, the coupling interfaces are radially spaced apart from one another. In particular, the coupling interfaces can be arranged substantially parallel to one another. The coupling interfaces can extend in the axial direction along the base element and/or the compensating element.

The coupling interfaces can be formed, for example, by several nested and axially movable threads of the base element and the compensating element.

A development of the invention provides that the base element and the compensating element are each designed as double rings. The respective double ring can be formed from an inner ring and an outer ring. The inner ring and outer ring of a respective double ring can be connected to one another via a connection web.

For example, the compensating element designed as a double ring can have an outer ring, which is in particular axially movable and is provided with an inner thread and an outer thread, and a movable, in particular axially movable, inner ring, which is provided with an outer thread. In other words: the compensating element is arranged movably, for example axially movably relative to the fixed base element. The inner ring, which is associated with the compensating element designed as a double ring, and the associated outer ring are hence also arranged movably, in particular axially movably, and designed as a movable inner ring and a movable outer ring.

The movable inner ring and the movable outer ring of the compensating element can be connected to one another via a contact section of the compensating element. For example, the contact section forms a connecting web. For example, the compensating element has on its upper side the contact section, which serves to support the device against a component and/or to support the compensating element on the base element. The movable inner ring and the movable outer ring of the compensating element can protrude from the contact section, for example, protrude substantially perpendicularly downwards.

For example, the base element can have a fixed, in particular a positionally fixed or stationary, outer ring, which is provided with an internal thread, and a fixed inner ring, in particular a positionally fixed or stationary inner ring, which is provided with an external thread and an internal thread. In other words: the base element is arranged, for example held, in a stationary or positionally fixed manner. The inner ring, which is associated with the base element designed as a double ring, and the associated outer ring are accordingly also arranged stationary or fixed in position and are designed as a fixed inner ring and a fixed outer ring.

The fixed inner ring and the fixed outer ring of the base element can be connected to one another via a contact section of the base element. For example, the contact section forms a connecting web. For example, the base element has the contact section on its underside, which serves to support the device against a component. The inner ring and the outer ring of the base element can protrude from the contact section, for example, protrude upward substantially perpendicularly.

In the pre-mounted and/or mounted state of the device, the movable inner ring of the compensating element can be accommodated in a cavity of the fixed inner ring of the base element. The movable outer ring of the compensating element can be accommodated between the fixed inner ring of the base element and the fixed outer ring of the base element. This forms a nested and axially movable coupling of the base element and the compensating element.

In one possible embodiment, the compensating element has an inner cavity in which at least one driving element is arranged for connection to a screw element. The inner cavity can be formed, for example, by an opening in the movable inner ring of the compensating element. The screw element can be in frictional engagement with the driving element in such a way that a torque exerted by the screw element can be transmitted to the compensating element, in particular to its movable inner ring, and the compensating element rotates therewith, in particular said element is axially screwed out of or screwed into the base element.

In addition, the compensating element can have a threaded element for being screwed to a screw element extending through the fixed inner ring of the base element and the movable inner ring of the compensating element.

In addition, a securing arrangement for securing, in particular fixing, the compensating element can be provided against a movement relative to the base element. The securing arrangement serves, for example, to secure elements during transport and/or prevent loss.

A second embodiment of the device according to the invention for compensating for tolerances between two components to be connected to one another, comprises at least one base element and a compensating element, which is in threaded engagement with the base element and can be moved from an initial position by rotation relative to the base element, wherein the base element has at least one first coupling space, a second coupling space, which is radially spaced apart from the first coupling space, and optionally, a third coupling space, and wherein the compensating element is designed to be in threaded engagement with the respective coupling space of the base element. The device enables a nested design with the same compensation path and a comparatively smaller, for example, flatter design.

For example, the first coupling space can be designed in the form of a cutout, which is provided with first threads. The second coupling space can be designed in the form of another cutout, which is provided with second threads. The first coupling space and the second coupling space can each be formed by thread pairings of an internal thread for the compensating element and an external thread of the base element, or from an external thread for the compensating element and an internal thread for the base element. The third coupling space can be designed in the form of a frictional connection. The third coupling space can be formed by a wall pairing of an inner wall of the compensating element and an outer wall of the base element, or a wall pairing of an outer wall of the compensating element and an inner wall of the base element. The coupling spaces can extend, for example, in the axial direction along the base element and/or the compensating element. The coupling spaces can be radially spaced apart from one another. The coupling spaces can be arranged to run parallel to one another.

The first threads can form an internal thread. The first threads can be brought into threaded engagement with the compensating element. The base element can, for example, be substantially hollow-cylindrical and have an internal thread in its inner side, i.e. on a lateral surface of its first, in particular inner, coupling space.

The second coupling space can be open on an end face of the base element and closed on the other end face of the base element. The second threads can form an internal thread, for example. The base element can have an internal thread in an inner side of the second coupling space, i.e. in a lateral surface of the second coupling space.

For example, the second coupling space of the base element can have third threads. The third threads can form an external thread. The second threads and third threads can be arranged on opposing walls of the second coupling space. The second and/or third threads can be/are brought into threaded engagement with the compensating element.

Furthermore, the base element can have an, in particular, fixed inner ring and an, in particular, fixed outer ring, which are connected to one another at an end face via a contact section, for example, a connecting web. The first coupling space is formed, for example, by the inner ring, for example, by an inner opening of the inner ring, and/or in the inner ring. The second coupling space is arranged, for example, between the inner ring and the outer ring of the base element. The second coupling space is separated from the first coupling space by the inner ring. The second coupling space is enclosed radially outwards by the outer ring of the base element. The inner ring and the outer ring are, for example, spaced apart radially from one another. For example, a first side, in particular an inner side, of the inner ring of the base element can be provided with the first threads. A second side, in particular an outer side, of the inner ring of the base element can be provided with the second threads. Alternatively or optionally additionally, an inner side of the outer ring of the base element can be provided with the third threads. The outer side of the inner ring and the inner side of the outer ring can face one another.

Furthermore, the compensating element can have an, in particular, movable inner ring and an, in particular, movable outer ring, which are connected to one another at an end face via a contact section, for example, a connecting web. The inner ring and the outer ring of the compensating element are, for example, spaced apart radially from one another. The inner ring of the compensating element is accommodatable or accommodated in the first coupling space of the base element. The outer ring of the compensating element is accommodatable or accommodated in the second coupling space of the base element. The outer ring of the compensating element can be provided with an internal thread, for example, corresponding to the second threads of the base element, and/or an outer thread, for example, corresponding to the third threads of the base element. The inner ring of the compensating element can be provided with an external thread, for example, corresponding to the first threads of the base element.

In one possible embodiment, the base element and the compensating element are each designed as double rings.

In the pre-mounted and/or mounted state of the device, the inner ring of the compensating element is arranged in the first coupling space of the base element and is in threaded engagement therewith. The outer ring of the compensating element is arranged in the second coupling space of the base element and is in threaded engagement therewith.

Both embodiments described above have a feature in common, which is that they can each have a driving element that is radially yielding and acts in the connection direction or insertion direction. By means of the driving element, a frictional connection with a connecting element, in particular, a fastening screw for connecting the two components and the device, can be produced or are produced. The connection direction is understood, in particular, to mean the axially acting connecting force of the device. The insertion direction is understood, in particular, to mean the insertion direction of the connecting element.

In one possible embodiment, the driving element can be designed, for example, as a radially expanding expansion body. The driving element can comprise, for example, at least one or more radially projecting nose(s), in particular one or more hook elements. The driving element preferably comprises two opposite, radially projecting, in particular, radially outwardly projecting noses. By means of the noses, the driving element is arranged in a rotationally fixed manner in the compensating element so that, if a force acts on the driving element, in particular a rotational force, the compensating element is entrained and rotates relative to the base element.

The expansion body can, for example, have, at least sectionally, at least one longitudinal slot, the width of which is matched to the radial tolerance to be bridged by deformation. The outer contour of the driving element is, in particular, adapted to the inner contour of the hollow cylindrical compensating element, in particular to its cavity.

In another embodiment, the driving element can be completely accommodated by the compensating element. This enables a particularly compact arrangement and pre-mounting of the driving element in the compensating element.

Common to both of the above-described embodiments, a holding device can be provided for connection to one of the components.

The holding device can be designed as an integrated part of the base element or of the compensating element or as a separate part. The holding device can be detachably arranged on one of the components in a form-fitting and/or force-fitting manner, for example as a latching connection, a clip connection or a clamping connection. This allows the device to be pre-mounted on one of the components in a simple manner.

In a separate embodiment, the holding device can, for example, be connected to the base element or the compensating element in a form-fitting and/or force-fitting manner.

For example, the holding device can be clipped, clamped or latched to the base element or the compensating element or can be detachably connected.

For further possible embodiments, the above-mentioned features can be used individually or in combination with one another.

DESCRIPTION OF THE DRAWINGS

Embodiments of the invention are explained in greater detail with reference to the drawings, in which.

DETAILED DESCRIPTION

Parts corresponding to one another are provided with the same reference signs in all the drawings.

Figure 1:
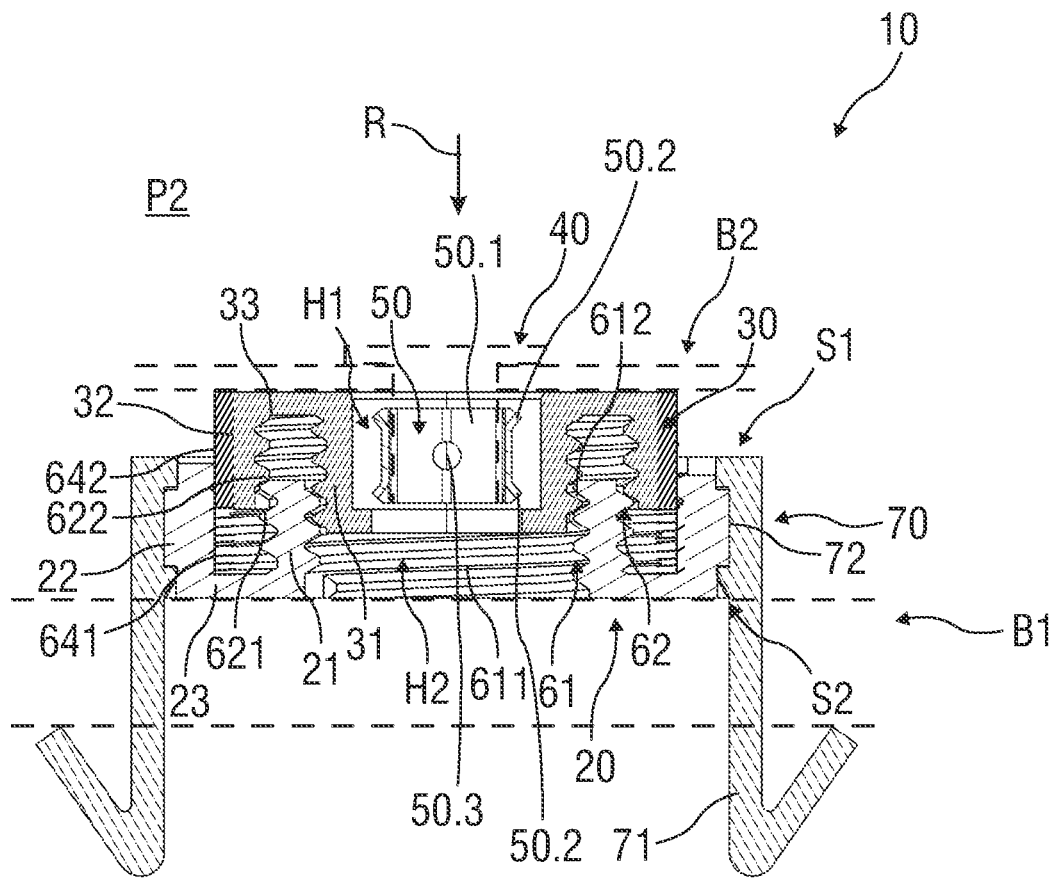
FIG. 1 schematically shows a sectional representation of a first exemplary embodiment of a device for compensating for tolerances between two components to be connected to one another with two coupling interfaces, FIG. 2 schematically shows a sectional representation of a second exemplary embodiment of a device for compensating for tolerances between two components to be connected to one another with two coupling interfaces, FIG. 3 schematically shows a sectional representation of a third exemplary embodiment of a device for compensating for tolerances between two components to be connected to one another with three coupling interfaces, FIG. 4 schematically shows a sectional representation of the device according to the exemplary embodiment according to FIG. 3, FIG. 5 schematically shows a perspective view of the device according to one of the exemplary embodiments according to FIGS. 1 to 3, FIG. 6 schematically shows a perspective view of a compensating element of the device according to FIG. 3, FIG. 7 schematically shows a perspective view of a base element according to FIG. 3, FIG. 8 schematically shows a sectional representation of a fourth exemplary embodiment of a device for compensating for tolerances between two components to be connected to one another with two coupling interfaces, FIG. 9 schematically shows a perspective view of the device according to the exemplary embodiment according to FIG. 8, for example, in a state of being transported, FIG. 10 schematically shows another perspective view of the device according to the exemplary embodiment according to FIG. 8, FIG. 11 schematically shows a perspective view of the device according to FIG. 10, FIG. 12 schematically shows a perspective view of a fifth exemplary embodiment of a device for compensating for tolerances between two components to be connected to one another with two coupling interfaces, FIG. 13 schematically shows a sectional representation of the device according to FIG. 12, FIG. 14 schematically shows a perspective view of a sixth exemplary embodiment of a device for compensating for tolerances between two components to be connected to one another with two coupling interfaces, FIG. 15 schematically shows a sectional representation of the device according to FIG. 14, FIG. 16 schematically shows a perspective view of a seventh exemplary embodiment of a device for compensating for tolerances between two components to be connected to one another with two coupling interfaces, FIG. 17 schematically shows a perspective view of an eighth exemplary embodiment of a device for compensating for tolerances between two components to be connected to one another with two coupling interfaces, and FIG. 18 schematically shows a sectional representation of the device according to FIG. 17.

FIG. 1 schematically shows a sectional representation of a first exemplary embodiment of a device 10 for compensating for tolerances between two components B1, B2 to be connected to each other, which are indicated by dashed lines. The device 10 can be, for example, a tolerance equalizing device and/or a tolerance compensation device.

FIG. 1 can represent the device 10, for example, in a mounted state with the components B1, B2.

The device 10 comprises a base element 20. The device 10 comprises a compensating element 30, which can be removed by rotating relative to the base element 20. The compensating element 30 is arranged coaxially with respect to the base element 20.

In the shown exemplary embodiment, the base element 20 has a first e.g. upper end face S1, and a second e.g. lower end face S2 opposite the first end face S1. The second end face S2 can rest on the first, lower component B1. The compensating element 30 is arranged on the first end face S1.

For connecting, in particular screwing, the components B1 and B2, the device 10 is arranged between them, and a screw element 40 or another fastening element is guided from above through an opening in the second component B2, through the device 10, and optionally additionally, for example, through an opening in the first component B1.

In this case, the screw element 40 can come into engagement, for example frictional engagement, with a driving element 50, which is arranged in the compensating element 30 in order to transmit a torque exerted by the screw element 40 to the compensating element 30.

Figure 4:
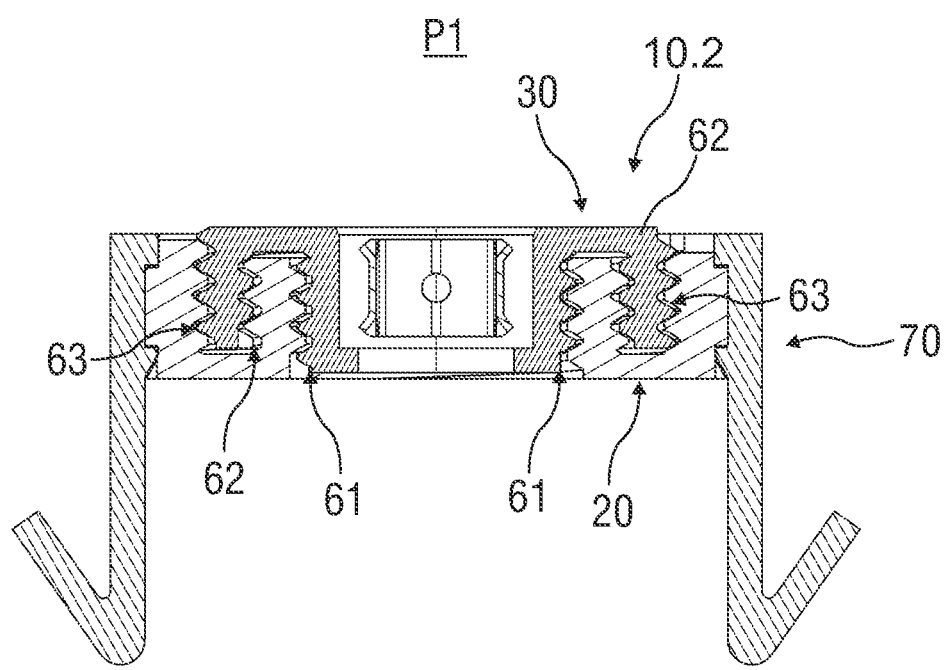

When screwing the screw element 40, the compensating element 30 is rotated relative to the base element 20 by means of the driving element 50 connected between the screw element 40 and the compensating element 30 and is therefore moved axially from its starting position P1, shown in FIG. 4, to the base element 20, e.g. moved out of the base element 20 until it reaches its compensating position P2 in which the base element 20 and the compensating element 30 each rest against one of the components B1, B2. Accordingly, for example, a joint gap can be compensated or bridged.

The driving element 50 is supported, for example, on a lateral surface of an inner cavity H1 in the compensating element 30. The driving element 50 can be a driving spring or another spring element.

The driving element 50 is designed, for example, as a driving element 50, which is radially yielding and acts in the direction R, in particular, in the connection direction or insertion direction. By means of the driving element 50, a frictional connection can be produced or is produced with a connecting element designed, for example, as a screw element 40 for connecting the two components B1, B2 and the device 10.

In one possible embodiment, the driving element 50 can be designed, for example, as a radially expanding expansion body 50.1. The driving element 50.1 can comprise, for example, at least one or more radially projecting nose(s) 50.2, in particular, one or more hook elements. The driving element 50 preferably comprises two opposite, radially projecting, in particular, radially outwardly projecting, noses 50.2. By means of the noses 50.2, the driving element 50 is arranged in a rotationally fixed manner in the compensating element 30, so that if force acts on the driving element 50, a torque is exerted on the compensating element, and it is entrained and rotates relative to the base element 20.

The expansion body 50.1 can have, for example, at least sectionally, at least one recess 50.3, in particular, a longitudinal slot or a through-opening, the width of which is matched to the radial tolerance to be bridged by deformation. The outer contour of the driving element 50 is, in particular, adapted to the inner contour of the hollow cylindrical compensating element 30, in particular, to its cavity H1.

In another embodiment, the driving element 50 can be completely accommodated by the compensating element 30. In other words: the driving element 50 is arranged completely in the cavity H1. This enables a particularly compact arrangement and pre-mounting of the driving element 50 in the compensating element 30.

The base element 20 and the compensating element 30 are placed one inside the other in such a way that at least two coupling interfaces 61, 62 and/or 63 and preferably three coupling interfaces 61 to 63 are formed between the base element 20 and the compensating element 30.

In principle, the base element 20 and the compensating element 30 can have essentially the same shape. The base element 20 and the compensating element 30 can be complementary to one another. As a result, a nested design with a sufficient tolerance compensation path and high load-bearing capacity can be achieved.

The two coupling interfaces 61, 62, and optionally 63, are radially spaced apart from one another. The coupling interfaces 61, 62, and optionally 63, are formed by a plurality of coupling sections, in particular axially movable threads 611, 612 and 621, 622, which are nested in one another and are axially movable in one another, and optionally axially-movable sliding sections 641, 642 of the base element 20 and compensating element 30. The optional coupling interface 63 is, for example, formed by two suitable sliding surfaces for axial mobility of the sliding sections 641 and 642 relative to one another.

In other words: the compensating element 30 and the base element comprise corresponding first threads 611, 612, which are aligned with one another and form a first coupling interface 61 in a threaded engagement. The compensating element 30 and the base element 20 comprise corresponding second threads 621, 622, which are aligned with one another and form a second coupling interface 62 in a threaded engagement. The compensating element 30 and the base element 20 comprise optional corresponding sliding sections 641, 642, which are aligned with one another and are slidingly coupled to form a third coupling interface 63.

The first coupling interface 61, the second coupling interface 62, and optionally the third coupling interface 63, run substantially parallel to one another in the axial direction along the base element 20 and the compensating element 30.

The base element 20 comprises first threads 611 and second threads 621, and optionally the sliding section 641. The first threads 611 form an internal thread, for example. The second threads 621 form an external thread, for example.

The compensating element 30 comprises corresponding first threads 612, second threads 622, and optionally the sliding section 642. The first threads 612 of the compensating element 30 form an external thread. The second threads 622 of the compensating element 30 form an internal thread.

The base element 20 is designed as a double ring. The compensating element 30 is designed as a double ring. The respective double ring is formed from an inner ring 21, 31, an outer ring 22, 32, and a contact section 23, 33 connecting these rings. For example, the respective contact section 23, 33 forms a connecting web.

The base element 20 comprises the contact section 23 on its, in particular the second, lower end face S2, which serves to support the device against the first component B1. A fixed, in particular positionally stable or positionally fixed inner ring 21 and a fixed, in particular positionally stable or positionally fixed outer ring 22 of the base element 20 protrude from the contact section 23, for example substantially vertically upward. The fixed inner ring 21 and the fixed outer ring 22 of the base element 20 are understood in particular to mean the fixed arrangement of the base element 20 in a holding device 70, in particular a retaining clip or retaining ring, wherein the base element 20 is held in a fixed position in a cutout 72 of the holding device 70 by means of a form-fit connection and/or friction-fit connection. In particular, the base element 20 is securely mounted in the holding device 70 against an axial movement and is accordingly fixedly arranged.

The holding device 70 serves to receive the base element 20 and the compensating element 30. To fix the device 10 in the component B1, the holding device 70 comprises holding arms 71.

The compensating element 30 comprises, at its end face opposite in particular the second end face S2 of the base element 20, the contact section 33, which serves to support the device 10 against the second component B2 and/or to support the compensating element 30 on the base element 20. The movable inner ring 31 and the movable outer ring 32 of the compensating element 30 protrude from the contact section 33, for example, substantially perpendicularly downwards. The movable inner ring 31 and movable outer ring 32 of the compensating element 30 are, in particular, understood to be the mobility of compensating element 30 itself, in particular, its axial mobility relative to base element 20.

The fixed inner ring 21 of the base element 20 includes a cavity H2. The movable inner ring 31 of the compensating element 30 can be guided through the cavity H2. In the initial position P1 (shown in FIG. 4), the movable inner ring 31 of the compensating element 30 can be completely accommodated in the cavity H2.

The fixed inner ring 21 of the base element 20 is provided with the first threads 611 as an internal thread. In the shown exemplary embodiment, the fixed inner ring 21 is furthermore provided with the second threads 621 as an external thread. This means that the fixed inner ring 21 of the base element 20 is provided on both sides, for example on its inner side and its outer side, with threads 611, 621. An inner side of the fixed outer ring 22, which faces the outer side of the inner ring 21, can have a flat and/or even, for example planar design, or have another structure and/or profile.

The movable inner ring 31 of the compensating element 30 includes the cavity H1. The movable inner ring 31 of the compensating element 30 is provided with the first threads 612 as an external thread. The movable outer ring 32 of the compensating element 30 is provided with the second threads 622 as an internal thread. The movable outer ring 32 has the second threads 622 on its inner side, i.e. on a side facing the outer side of the inner ring 21 of the base element 20. An outer side of the movable outer ring 32 can have a flat and/or even, for example planar design, or have a different structure and/or profile.

In the pre-mounted and/or mounted state and/or in the initial position P1 and/or in the compensating position P2 of the device 10, the movable inner ring 31 of the compensating element 30 is in threaded engagement with the fixed inner ring 21 of the base element 20. The movable outer ring 32 of the compensating element 30 is in threaded engagement with the fixed inner ring 21 of the base element 20. The movable outer ring 32 of the compensating element 30 is arranged between the fixed inner ring 21 of the base element 20 and the fixed outer ring 22 of the base element 20. This forms a nested and axially movable coupling of the base element 20 and the compensating element 30.

Figure 5:
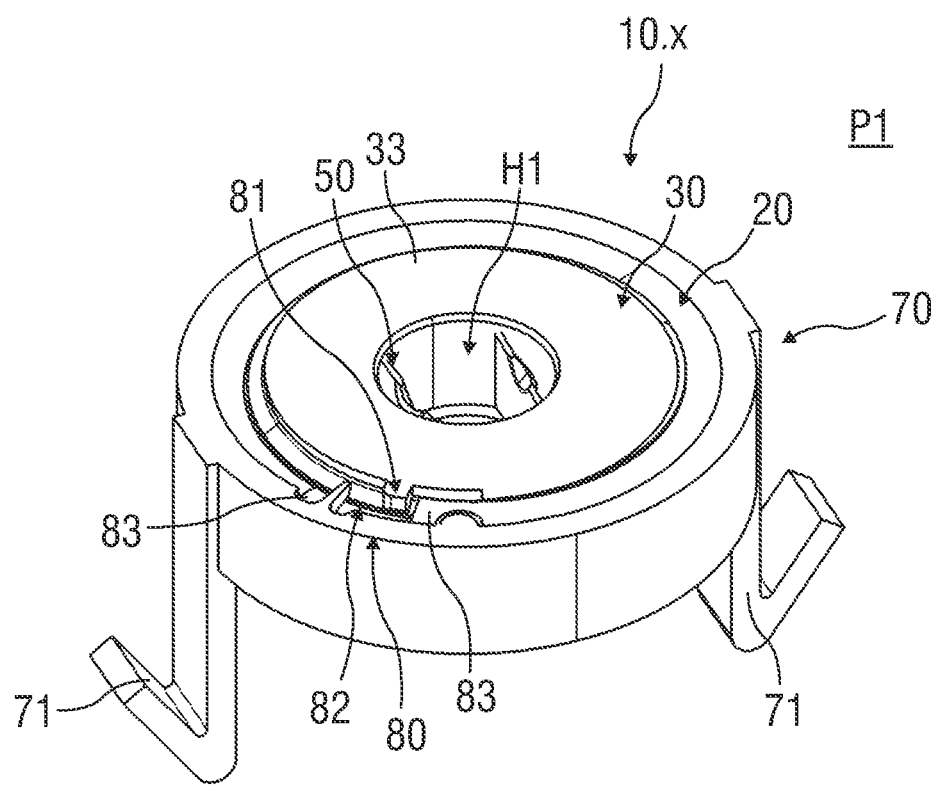

The device 10 further comprises, for example, the holding device 70, which is coupled to the base element 20. The holding device 70 comprises, for example, at least one protruding holding arm 71, which supports the device 10 in a mounted state against the first component B1 and/or comes into latching engagement with the first component B1. The holding arm 71 can be designed as a J-clip, clamping element, latching element, hook element, spring element or as another corresponding holding element. The holding device 70 can have at least two holding arms 71 arranged opposite one another, as shown in FIG. 5. The holding device 70 can also be a push-on latching element. The holding device 70 can be a bayonet device or a film hinge. The holding device 70 is arranged, for example, on the fixed outer ring 22 of the base element 20 and is at least frictionally, positively and/or integrally connected thereto. The holding device 70 can be integrated in the compensating element 30 or base element 20. The device 10 can comprise two holding devices 70. The holding device 70 can be arranged on the compensating element 30. An additional or alternative holding device 70 can be arranged on the base element 20. For example, the holding device 70 or the holding devices 70 can each be pushed laterally onto the compensating element 30 and/or onto the base element 20.

Figure 2:
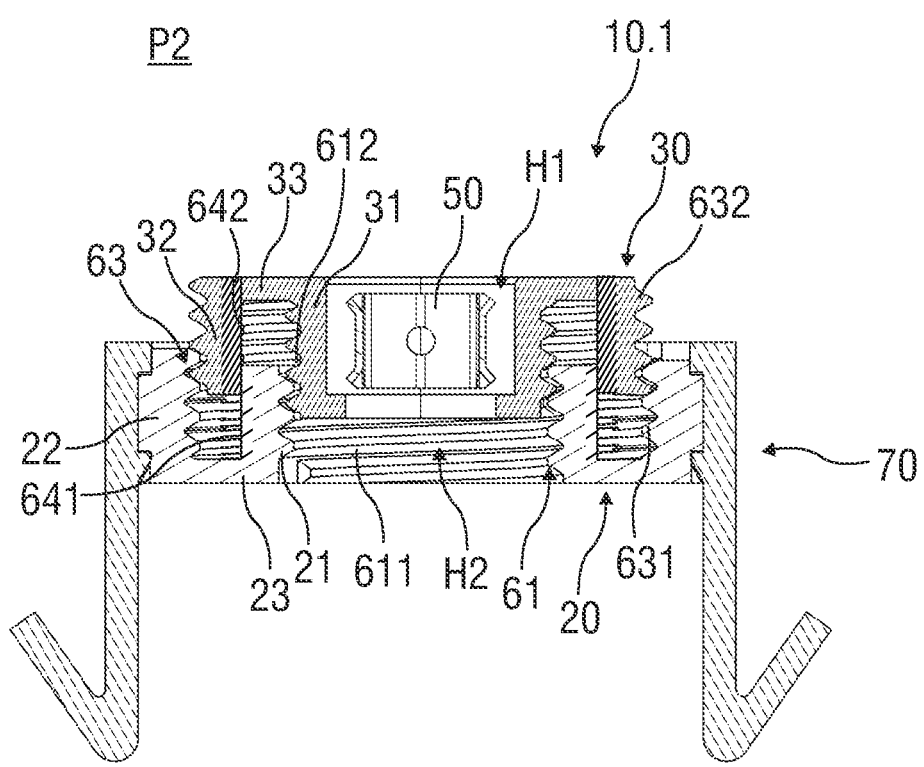

FIG. 2 schematically shows a sectional representation of a second exemplary embodiment of a device 10.1 for compensating for tolerances between two components B1, B2 to be connected to one another with three coupling interfaces 61, 62 and 63.

The device 10.1 according to FIG. 2 differs from the device 10 according to FIG. 1 in that the coupling interfaces 62 and 63 have been exchanged so that the inner coupling interface 62 is formed as a sliding interface, and the outer coupling interface 63 is formed as a threaded interface.

The base element 20 comprises first threads 611 of the first coupling interface 61, and a sliding section 641 for the second coupling interface element 62, and third threads 631 for the third coupling interface 63. The first threads 611 form, for example, an internal thread of the fixed inner ring 21. The sliding section 641 forms a sliding outer surface of the fixed inner ring 21. The third threads 631 also form, for example, an internal thread of the fixed outer ring 22.

The compensating element 30 comprises corresponding first threads 612 and third threads 632 and a corresponding sliding section 642. The first threads 612 of the compensating element 30 form an external thread of the movable inner ring 31. The third threads 632 of the compensating element 30 likewise form an external thread of the movable outer ring 32. The sliding section 642 forms a sliding inner surface of the fixed outer ring 32.

The compensating element 30 and the base element 20 comprise corresponding first threads 611, 612, which are aligned with one another and form the first coupling interface 61 in a thread engagement. The compensating element 30 and the base element 20 comprise corresponding sliding sections 641, 642, which are aligned with one another and are slidingly coupled by means of the second coupling interface 62. The compensating element 30 and the base element 20 comprise corresponding third threads 631, 632, which are aligned with one another and form the third coupling interface 63 in a threaded engagement.

The first coupling interface 61 to the third coupling interface 63 extend substantially parallel to one another in the axial direction along the base element 20 and the compensating element 30.

The base element 20 is designed as a double ring. The compensating element 30 is designed as a double ring. The respective double ring is formed from an inner ring 21, 31, an outer ring 22, 32, and a contact section 23, 33 connecting these rings. For example, the respective contact section 23, 33 forms a connecting web.

The base element 20 comprises on its second, lower end face S2 the contact section 23, which serves to support the device 10.1 against the first component B1. The inner ring 21 and the outer ring 22 of the base element protrude from the contact section 23, for example, substantially vertically upward.

The compensating element 30 comprises on its end face opposite the second end face S2 of the base element 20 the contact section 33, which serves to support the device 10.1 against the second component B2 and/or support the compensating element 30 on the base element 20. The inner ring 31 and the outer ring 32 of the compensating element 30 protrude from the contact section 33, for example, substantially perpendicularly downwards.

The inner ring 21 of the base element 20 includes a cavity H2. The inner ring 31 of the compensating element 30 can be guided through the cavity H2. In the initial position P1, the inner ring 31 of the compensating element 30 can be completely accommodated in the cavity H2. The inner ring 21 of the base element 20 is provided with the first threads 611. In the shown exemplary embodiment, the outer ring 22 of the base element 20 is provided with the second threads 621. In contrast to the exemplary embodiment according to FIG. 1, an outer side of the inner ring 21 of the base element 20 can be designed to be planar, for example.

The inner ring 31 of the compensating element 30 includes the cavity H1. The inner ring 31 of the compensating element 30 is provided with the first threads 612. The outer ring 32 of the compensating element 30 is provided with the second threads 622. The outer ring 32 has the second threads 622 on its outer side. In contrast to the exemplary embodiment according to FIG. 1, an inner side of the outer ring 32 can be designed to be planar, for example.

Figure 3:
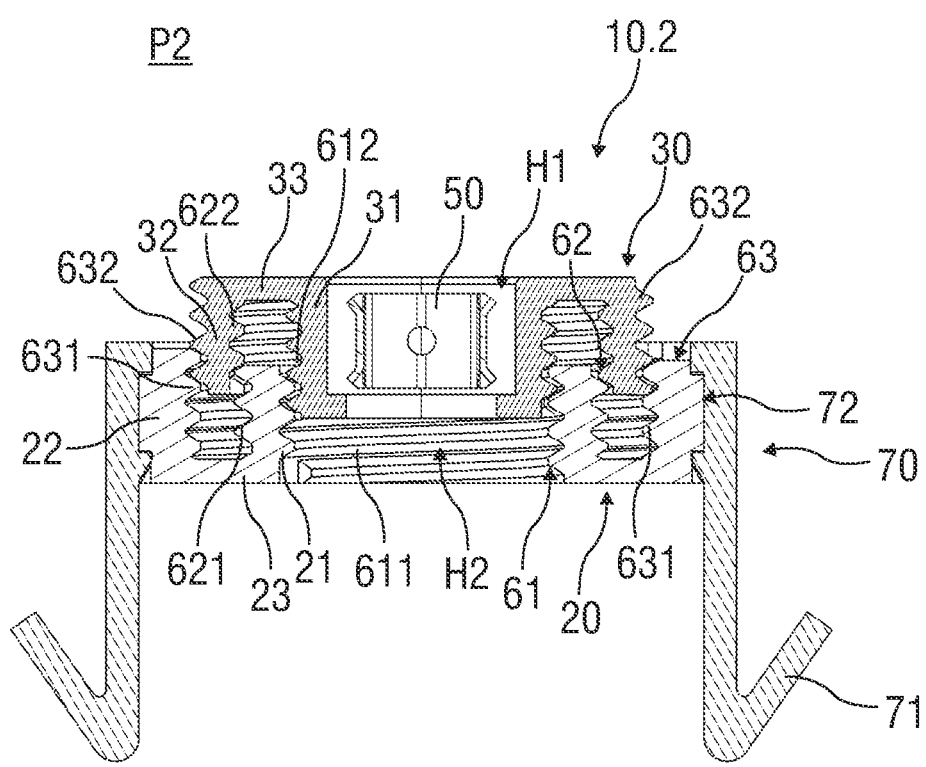

FIG. 3 schematically shows a sectional representation of a third exemplary embodiment of a device 10.2 for compensating for tolerances between two components B1, B2 to be connected to one another with three coupling interfaces 61 to 63.

The base element 20 comprises first threads 611, second threads 621, and third threads 631. The first threads 611 form an internal thread, for example. The second threads 621 form an external thread, for example. The third threads 631 form another internal thread, for example. The second threads 621 and the third threads 631 are formed opposite or facing each other.

The compensating element 30 comprises corresponding first threads 612, second threads 622, and third threads 632. The first threads 612 of the compensating element 30 form an external thread. The second threads 622 of the compensating element 30 form an internal thread. The third threads 632 of the compensating element 30 form another external thread. The first threads 612 and the second threads 622 are formed opposite or facing each other.

The compensating element 30 and the base element 20 comprise corresponding first threads 611, 612, which are aligned with one another and form the first coupling interface 61 in a thread engagement. The compensating element 30 and the base element 20 comprise corresponding second threads 621, 622, which are aligned with one another and form the second coupling interface 62 in a threaded engagement. The compensating element 30 and the base element 20 comprise corresponding third threads 631, 632, which are aligned with one another and form the third coupling interface 63 in a threaded engagement.

The first coupling interface 61, the second coupling interface 62, and the third coupling interface 63 run substantially parallel to one another in the axial direction along the base element 20 and the compensating element 30.

The base element 20 is designed as a double ring. The compensating element 30 is designed as a double ring. The respective double ring is formed from an inner ring 21, 31, an outer ring 22, 32, and a contact section 23, 33 connecting these rings. For example, the respective contact section 23, 33 forms a connecting web.

The base element 20 comprises on its second, lower end face S2 the contact section 23, which serves to support the device 10.2 against the first component B1. The inner ring 21 and the outer ring 22 of the base element protrude from the contact section 23, for example, substantially vertically upward.

The compensating element 30 comprises on its end face opposite the second end face S2 of the base element 20 the contact section 33, which serves to support the device 10.2 against the second component B2 and/or to support the compensating element 30 on the base element 20. The inner ring 31 and the outer ring 32 of the compensating element 30 protrude from the contact section 33, for example, substantially perpendicularly downwards.

The inner ring 21 of the base element 20 includes a cavity H2. The inner ring 31 of the compensating element 30 can be guided through the cavity H2. In the initial position P1, the inner ring 31 of the compensating element 30 can be completely accommodated in the cavity H2. The inner ring 21 of the base element 20 is provided on the inside with the first threads 611. In the illustrated exemplary embodiment, the inner ring 21 is furthermore on the outside with the second threads 621. The outer ring 22 of the base element 20 is provided with the third threads 631. For example, the outer ring 22 is provided on the inside with the third threads 631. The outer ring 22 can be flat and/or even, for example planar, or have a structure and/or profiling on the outside, which can be connected to a holding device 70 in a force fit, form fit and/or integral fit.

The inner ring 31 of the compensating element 30 includes the cavity H1. The inner ring 31 of the compensating element 30 is provided with the first threads 612. The outer ring 32 of the compensating element 30 is provided on the inside with the second threads 622. The outer ring 32 of the compensating element 30 is provided on the outside with the third threads 632. In principle, the base element 20 and the compensating element 30 can have essentially the same shape. The base element 20 and the compensating element 30 can be designed to be complementary to one another. As a result, a nested design with a sufficient tolerance compensation path and a high load-bearing capacity can be achieved.

In the pre-mounted and/or mounted state and/or in the initial position P1 and/or in the compensating position P2 of the device 10.2, the inner ring 31 of the compensating element 30 is in threaded engagement with the inner ring 21 of the base element 20. The outer ring 32 of the compensating element 30 is in threaded engagement with the inner ring 21 of the base element 20. The outer ring 32 of the compensating element 30 is arranged between the inner ring 21 of the base element 20 and the outer ring 22 of the base element 20.

FIG. 4 schematically shows a sectional representation of the device 10.2 according to the exemplary embodiment according to FIG. 3, wherein the base element 20 and the compensating element 30 are placed one inside the other in such a way that three coupling interfaces 61 to 63 are formed between the base element 20 and the compensating element 30.

FIG. 5 schematically shows a perspective view of the device 10.x according to one of the exemplary embodiments 10, 10.1 to 10.3 according to FIGS. 1 to 4. FIG. 5 shows the device 10.x, for example, in a starting position P1.

The device 10. x can comprise, for example, a securing arrangement 80 for securing the compensating element 30 against a movement relative to the base element 20. The securing arrangement 80 comprises a first securing element 81 formed on an outer circumference, for example, on an edge of a contact section 33 of the compensating element 30. The first securing element 81 is molded onto the compensating element 30. The first securing element 81 is designed as a projecting pin or cam. Furthermore, the securing arrangement 80 comprises a second securing element 82 arranged on an outer circumference, for example, on an edge of a contact section 23, on the base element 20. The second securing element 82 is molded onto the base element 20. The second securing element 82 is designed, for example, as an outer guide track or cam track for forced guidance of the first securing element 81. In this case, the second securing element 82 can be designed as a circular segment and have end stops 83.

The securing arrangement 80 is, for example, a loss prevention device and/or a transport lock. By means of the securing arrangement 80, the compensating element 30 is secured against movement relative to the base element 20 in order to prevent unintentional movement of the compensating element 30 relative to the base element 20 while the device 10.x is being transported.

While mounting the device 10.x and transmitting the torque from the screw element 40 to the compensating element 30, the latter is rotated in such a way that the first securing element 81 slides over the second securing element 82 while overcoming a predetermined securing torque, and/or over a first end stop 83, and releases the movement of the compensating element out of the base element 20. The specified securing torque is smaller than the torque that can be transmitted from the screw element 40 to the compensating element 30 via the driving element 50.

Figure 6:
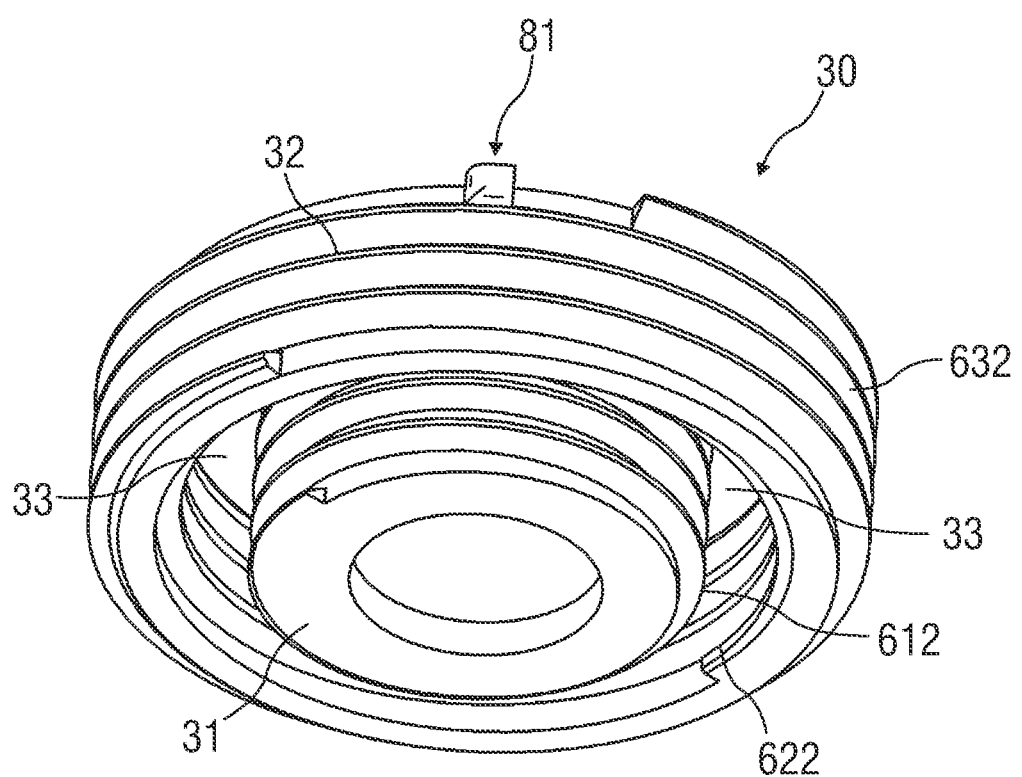

FIG. 6 schematically shows a perspective view of the compensating element 30 according to FIG. 3. The compensating element 30 is designed as a double ring with the threads 612 and 632 designed as an external thread and the thread 622 designed as an internal thread. The double ring of the compensating element 30 comprises an inner ring 31, an outer ring 32, and a contact section 33 connecting the rings. The securing element 81 of the compensation element 30 is designed, for example, as a protruding element.

Figure 7:
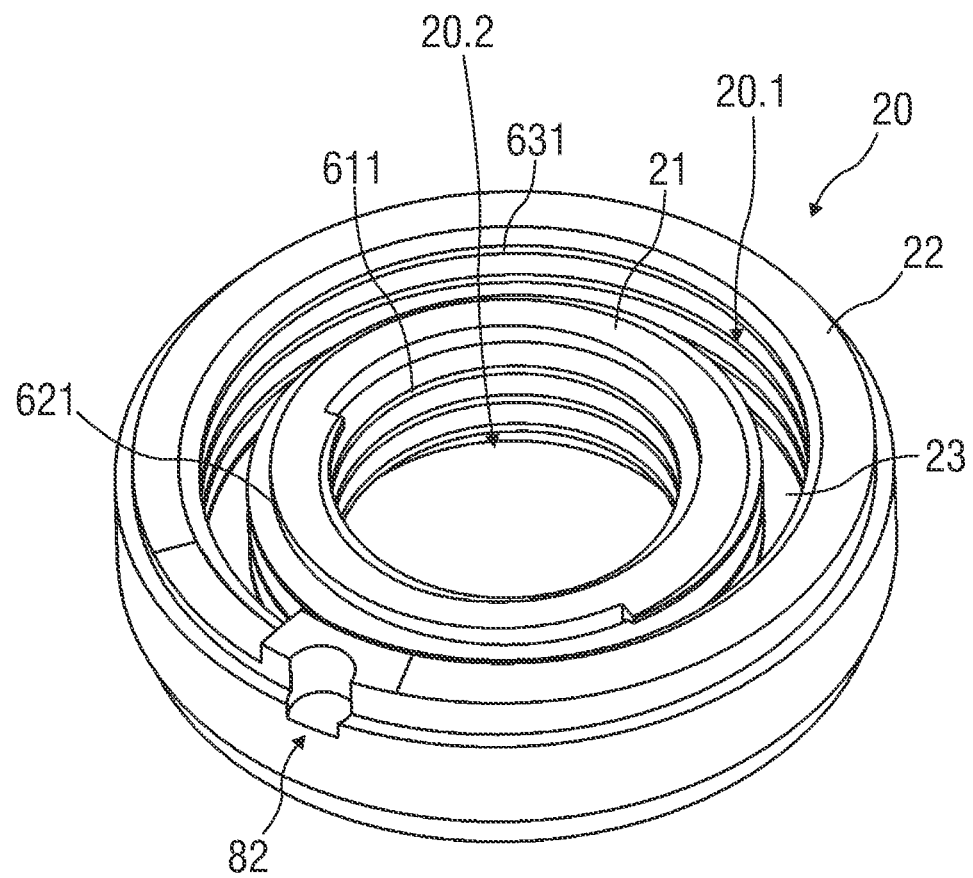

FIG. 7 schematically shows a perspective view of the base element 20 according to FIG. 3. The base element 20 is designed as a double ring with the threads 611 and 631 designed as an internal thread, and the thread 621 is designed as an external thread. The double ring of the base element 20 comprises an inner ring 21, an outer ring 22 and a contact section 23 connecting the rings. The securing element 82 is formed as a notch for the protruding element of the compensation element 30.

The base element 20 has, for example, at least a first coupling space 20.1 and a second coupling space 20.2, which is radially spaced apart from the first coupling space 20.1. The compensating element 30 is designed to be in threaded engagement with the respective coupling space 20.1, 20.2 of the base element 20. The device 10.x enables a nested design with the same compensation path and comparatively smaller, for example flatter, design.

For example, the first coupling space 20.1 can be designed in the form of a cutout, which is provided with the threads 621, 631. The second coupling space 20.2 can be designed in the form of another cutout, which is provided with the thread 611.

The first coupling space 20.1 and the second coupling space 20.2 can each be formed by thread pairings of an internal thread of the compensating element 30 and an external thread of the base element 20, or from an external thread of the compensating element 30 and an internal thread of the base element 20.

Instead of a thread pairing, the compensating element 30 and the base element 20 can engage with one another in the respective coupling space 20.1 and/or 20.2 in the form of a frictional connection, as is shown by way of example in FIGS. 1 and 2 with reference to the sliding sections 641, 642. The frictional connection can be formed, for example, by a wall pairing of an inner wall of the compensating element 30 and an outer wall of the base element 20, or by a wall pairing of an outer wall of the compensating element 30 and an inner wall of the base element 20. The coupling spaces 20.1, 20.2 can extend, for example, in the axial direction along the base element 20 and/or the compensating element 30. The coupling spaces 20.1, 20.2 can be spaced apart radially from one another. The coupling spaces 20.1, 20.2 can be arranged to run parallel to one another.

All threads 611 to 632 shown in the examples are designed as metric screw threads and form a multiple form-fitting and force-fitting connection of the base element 20 and the compensating element 30. The respective threads 611 to 632 can be designed as round threads or pointed threads. The threads 611 to 632 are configured as a movement thread, which converts a rotating movement of the compensating element 30 relative to the base element 20 into a linear compensating movement of the compensating element 30 relative to the base element 20.

Figure 8:
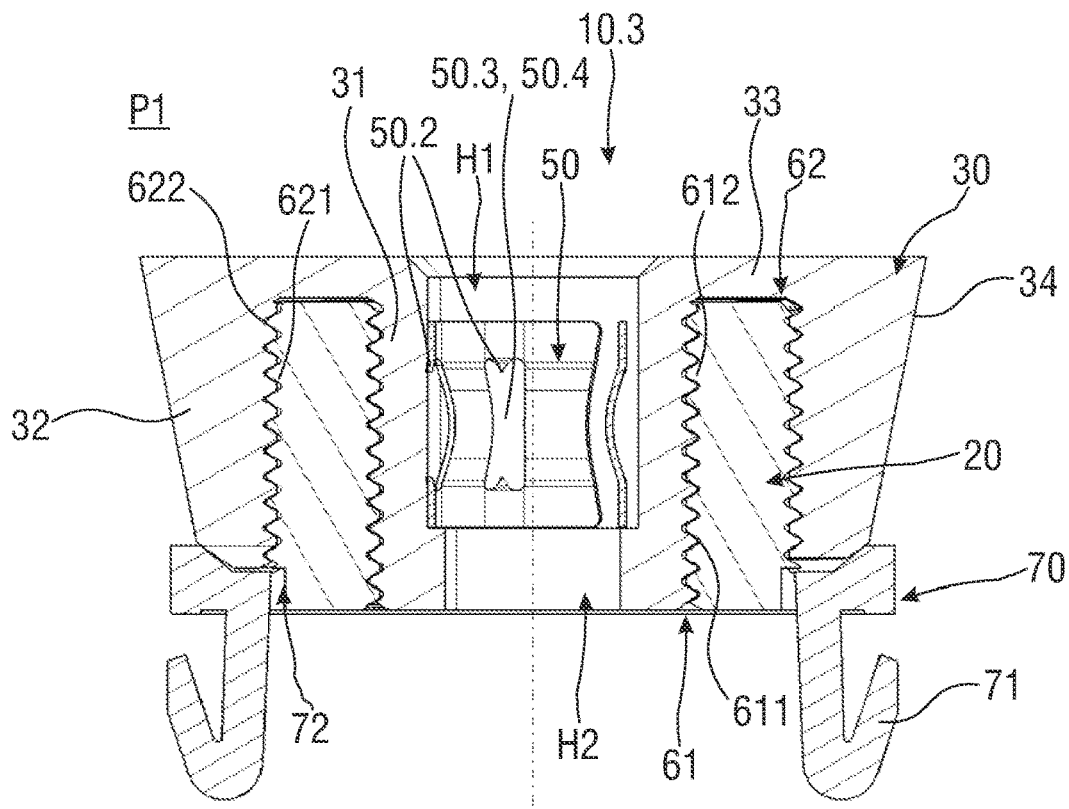

FIG. 8 schematically shows a sectional illustration of a fourth embodiment of a device 10.3 for compensating for tolerances between two components B1, B2 to be connected to one another with two coupling interfaces 61, 62.

The device 10.3 comprises a base element 20 and a compensating element 30, which can be moved relative to the base element 20 by rotation. The compensating element 30 is arranged coaxially to the base element 20. The functions and functional sequences of the base element 20 and the compensating element 30 correspond to the functions and functional sequences as described above.

In principle, the base element 20 and the compensating element 30 can have essentially the same shape. The base element 20 and the compensating element 30 can be complementary to one another. As a result, a nested design with a sufficient tolerance compensation path and high load-bearing capacity can be achieved.

In the shown embodiment, the compensating element 30 is conical, for example, conically tapering. The compensating element 30 can have a conical annular body. The compensating element 30 can have a circumferential bevel 34 on the outside. A different annular body shape can also be formed. For example, the compensating element 30 can have an outer circumference with a larger diameter on the end face and an outer circumference with a smaller diameter on the opposite the end face.

Figure 9:
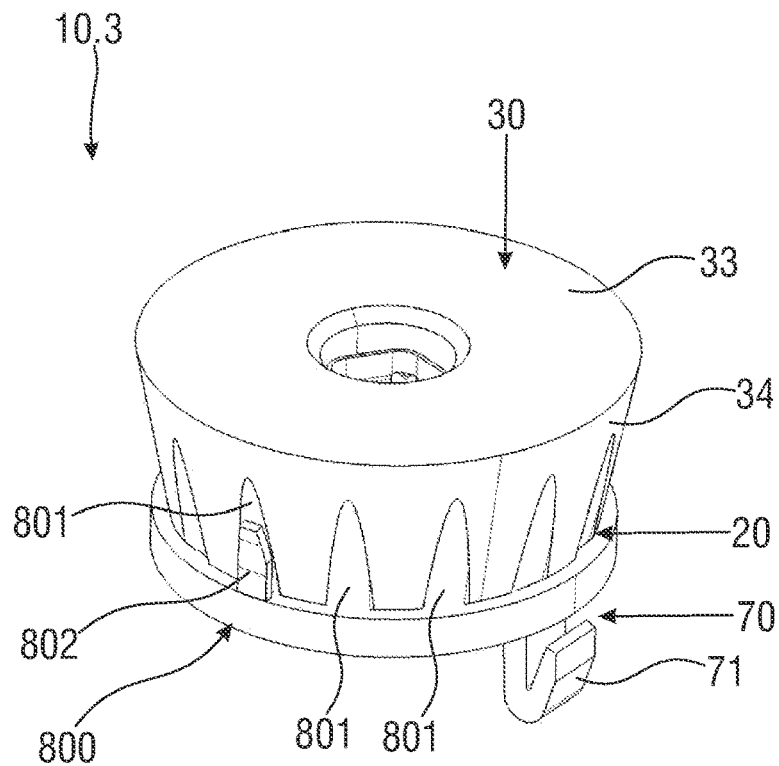

When screwing the screw element 40, the compensating element 30 is rotated relative to the base element 20 by means of the driving element 50 connected between the screw element 40 and the compensating element 30, and is therefore moved axially from its starting position P1, shown in FIG. 9, to the base element 20, e.g. moved out of the base element 20 until it reaches a compensating position in which the compensating element 30 is displaced relative to the base element 20. The compensating element 30 and the base element 20 can then each rest against one of the components B1, B2. Accordingly, for example, a joint gap can be compensated or bridged. The driving element 50 is supported, for example, on a lateral surface and/or on an inner support element of an inner cavity H1 of the compensating element 30. The driving element 50 can be a driving spring or another spring element.

The base element 20 and the compensating element 30 are placed one inside the other in such a way that two coupling interfaces 61, 62 are formed between the base element 20 and the compensating element 30. The two coupling interfaces 61, 62 are spaced apart radially from one another. The coupling interfaces 61, 62 are formed by several nested and axially movable coupling sections, in particular axially movable threads 611, 612 and 621, 622 of the base element 20 and compensating element 30. The first coupling interface 61 and the second coupling interface 62 run substantially parallel to one another in the axial direction along the base element 20 and the compensating element 30.

The base element 20 comprises first threads 611 and second threads 621. The first threads 611 form an internal thread, for example. The second threads 621 form an external thread, for example. The compensating element 30 comprises corresponding first threads 612 and second threads 622. The first threads 612 of the compensating element 30 form an external thread. The second threads 622 of the compensating element 30 form an internal thread.

The base element 20 is designed as a ring or annular shape. The compensating element 30 is designed as a double ring. The compensating element 30 comprises an inner ring 31, an outer ring 32, and a contact section 33 connecting the rings. The outer ring 32 has, for example, the bevel 34. For example, the compensating element 30 is beveled in the direction of the base element 20.

The base element 20 comprises a holding device 70. The base element 20 and the holding device 70 can be formed in one piece. The holding device 70 can be designed as a retaining ring or retaining clip. The holding device 70 serves as a connecting element to a customer interface or to one of the components B1, B2. Alternatively, the holding device 70 is designed as a separate element and is connected to the base element 20. The base element 20 can be held in a fixed position in a cutout 72 in the holding device 70 by means of a form-fit connection and/or force-fit connection. The base element 20 is secured in the holding device 70 against an axial movement and is accordingly fixedly arranged. For fixing the device 10.3, for example, in the component B1, the holding device 70 comprises holding arms 71. The holding arms 71 can be designed in the form of a clip, for example L-shaped or J-shaped clips, or as a folding hinge or a bayonet device.

In the shown exemplary embodiment, the compensating element 30 is connected to the base element 20 in such a way that the outer circumference with a smaller diameter of the compensating element 30 is directed in the direction of the holding device 70 and/or the base element 20. A reverse design or arrangement is also possible. The holding device 70 can have a seat encompassing the cutout 72, which surrounds the outer circumference of the compensating element 30, in particular, the one with the smaller diameter.

The driving element 50 is slightly modified and comprises longitudinal slots 50.4 as recess 50.3. The radially outwardly projecting noses 50.2 are arranged on opposite longitudinal ends of the recesses 50.3 designed as longitudinal slots 50.4.

FIG. 9 schematically shows a perspective view of the device 10.3 according to the exemplary embodiment according to FIG. 8, for example, in a state of being transported.

The device 10.3 can comprise a securing arrangement 800 for securing the compensating element 30 against movement relative to the base element 20. The securing arrangement 800 comprises at least one first securing element 801 formed on an outer circumference, for example, on an outer lateral surface of the compensating element 30, in particular on its bevel 34. The first securing element 801 is molded onto the compensating element 30. The first securing element 801 is designed as a groove, a guide channel, a cutout, or recess. In the shown exemplary embodiment, the compensating element 30 comprises a plurality of securing elements 801.

The compensating element 30 is provided on the outer periphery with a plurality of, for example, grooves, or cutouts, or bulges, or ribs 803 as securing elements 801. In particular, the outer ring 32 of the compensating element 30 is provided with a plurality of securing elements 801. The securing elements 801 extend axially and are arranged circumferentially and distributed on the outer lateral surface of the compensating element 30. The securing elements 801 are arranged spaced apart from one another.

Furthermore, the securing arrangement 800 comprises a second securing element 802 arranged on an outer circumference, for example on an edge of a holding device 70 and/or the base element 20. The second securing element 802 is molded, for example, onto the holding device 70, for example, onto a base body of the holding device 70 and/or on the base element 20. The second securing element 802 can be formed by a spring element. The second securing element 802 is designed, for example, as a protruding pin, a protruding latching nose, a latching hook, or a tab. The second securing element 802 can latch into one of the securing elements 801 of the compensating element 30. The securing element 802 is pre-tensioned radially inward.

While mounting the device 10.3 and transmitting the torque from the screw element 40 to the compensating element 30, the latter is rotated in such a way that the second securing member 802 slides over the first securing member 801, overcoming a predetermined securing torque, and allows the movement of the compensating element 30 out of the base element 20. The specified securing torque is smaller than the torque that can be transmitted from the screw element 40 to the compensating element 30 via the driving element 50.

Figure 10:
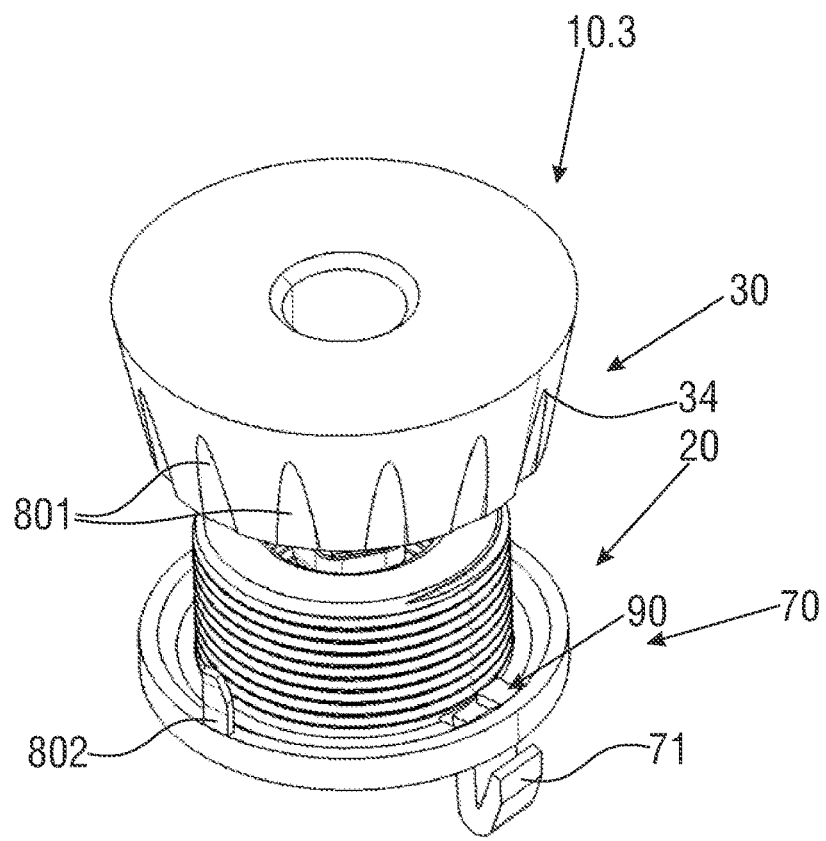
Figure 11:
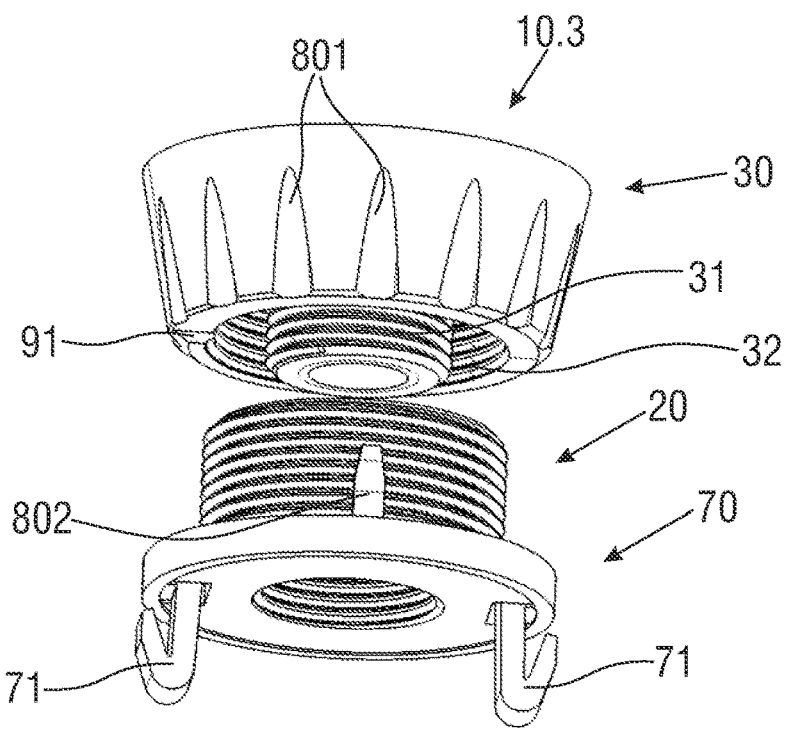

FIG. 10 schematically shows another perspective view of the device 10.3 according to the exemplary embodiment according to FIG. 8. FIG. 11 shows a schematic perspective view of the device 10.3 according to FIG. 10.

Optionally, in addition, the compensating element 30 can have at least one end stop 90 on its underside directed toward the base element 20. The holding device 70 and/or the base element 20 can have a corresponding end stop 91.

For example, the end stops 90, 91 are designed in the form of protruding and corresponding noses or other contact elements.

The securing arrangement 800 is, for example, a loss prevention device and/or a transport lock. By means of the securing arrangement 800, the compensating element 30 is secured against movement relative to the base element 20 in order to prevent unintentional movement of the compensating element 30 relative to the base element 20 while the device 10.3 is being transported. Optionally in addition, a rotation, in particular an overrotation, of the compensating element 30 relative to the base element 20 can be prevented by the end stops 90, 91.

Figure 12:
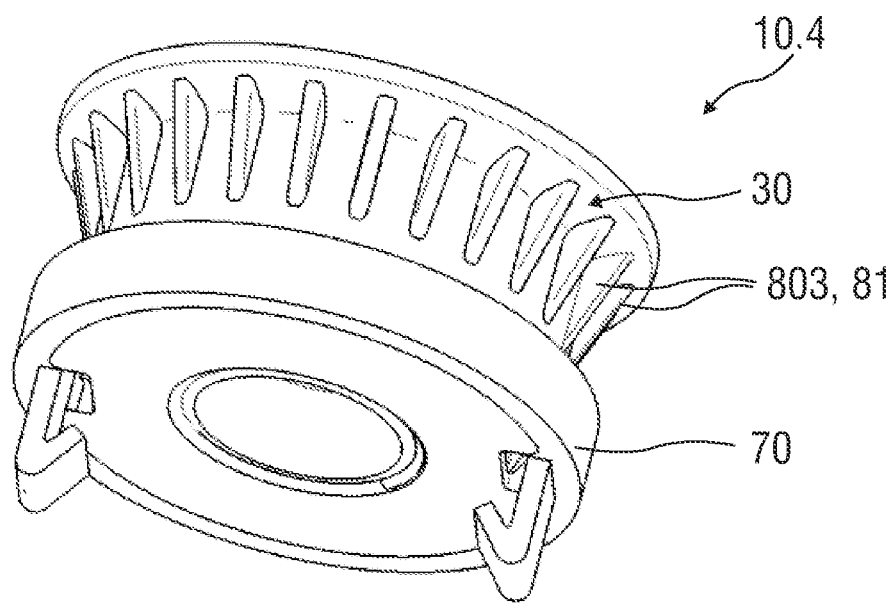

FIG. 12 shows a schematic perspective view of a fifth exemplary embodiment of a device 10.4 for compensating for tolerances between two components B1, B2 to be joined together (shown in FIG. 1).

The device 10.4 differs from the devices 10 to 10.3 in the outer shape of compensating element 30 and the shape and design of the securing arrangement 80 of the compensating element 30. Instead of notches or grooves as securing elements 81, the compensating element 30 according to FIG. 12 has a number of radially outwardly protruding ribs 803 as securing elements 81.

Similar to the compensating element 30 according to FIGS. 8 to 11, the compensating element 30 has a frustoconical outer contour. The compensating element 30 according to FIGS. 1 to 7 has a cylindrical outer contour.

Figure 13:
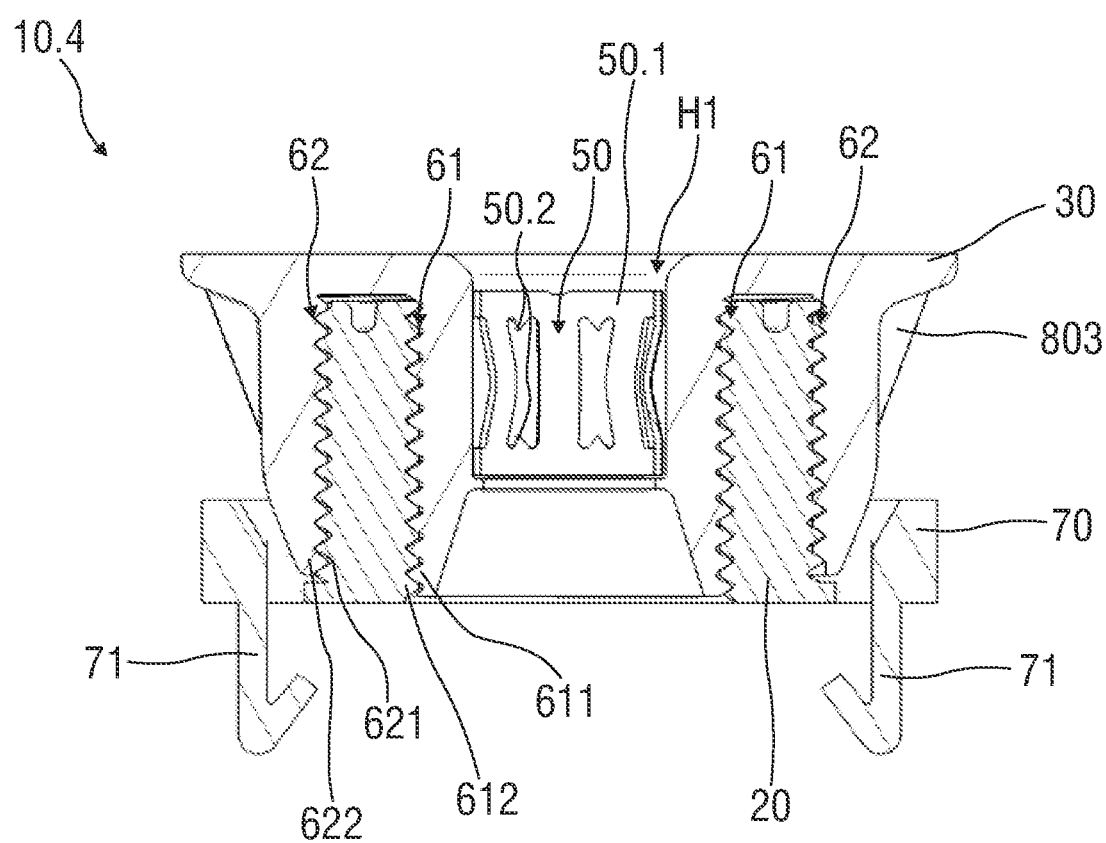

FIG. 13 schematically shows a sectional representation of the device 10.4 according to FIG. 12. The device 10.4 has the two coupling interfaces 61, 62 between the compensating element 30 and the base element 20 with the associated interlocking threads 611 and 612 or 621 and 622. The driving element 50 is arranged completely in the cavity H1 of the compensating element 30 and comprises the expansion body 50.1 with the noses 50.2.

The holding device 70 comprises the two opposing holding arms 71 for detachable arrangement in one of the components B1 or B2.

Figure 14:
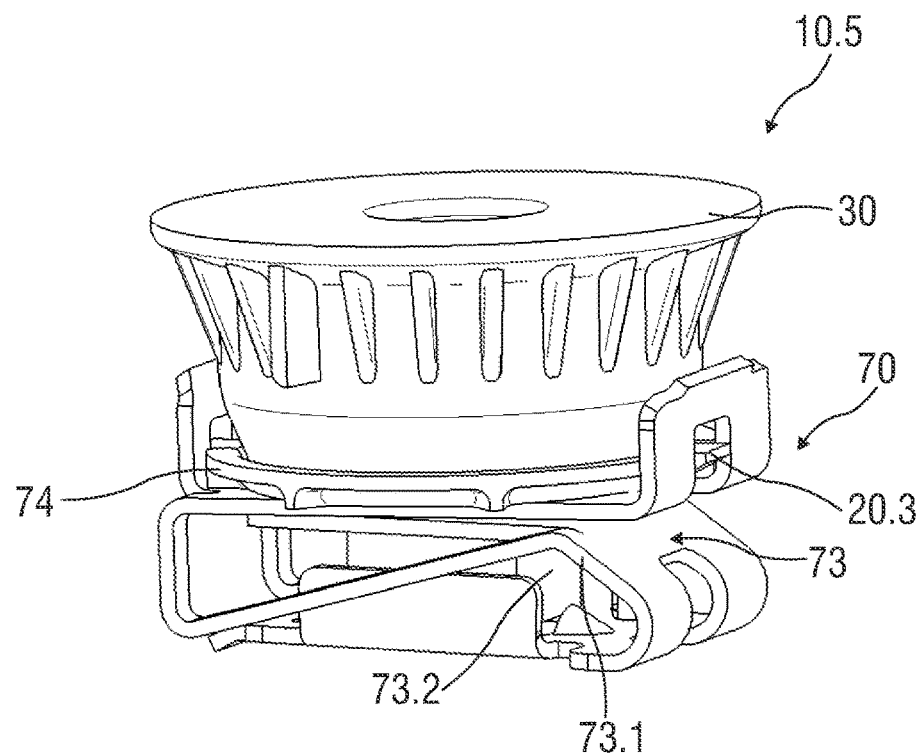

FIG. 14 shows a schematic perspective view of a sixth exemplary embodiment of a device 10.5 for compensating for tolerances between two components B1, B2 to be joined together. The compensating element 30 is designed analogously to the compensating element 30 according to FIGS. 12 and 13.

The device 10.5 differs only in the holding device 70. The holding device 70 is designed as a clamping unit 73. The clamping unit 73 is designed in such a way that it can be detachably fastened both to the base element 20, in particular to clamping noses 20.3, and to one of the components B1 or B2 by means of a clamping clip 73.1.

The clamping clip 73.1 is produced, for example, from spring steel and can comprise a nut element 73.2 for screwing to the screw element 40 extending through the device 10.5 (shown in FIG. 1), for example, a screw or a threaded bolt. The clamping clip 73.1 with a nut element 73.2 is also referred to as a snap nut. The device 10.5 can be fastened to one of the components B1 or B2 by means of the clamping clip 73.1.

In the shown exemplary embodiment, the clamping clip 73.1 is located on an underside of the device 10.5. The clamping clip 73.1 is suspended on the two clamping noses 20.3 (also called fastening hooks), which are, for example, molded onto a fastening ring 74 of the holding device 70 of the device 10.5. The fastening ring 74 can, for example, be fixedly connected to the base element 20.

Figure 15:
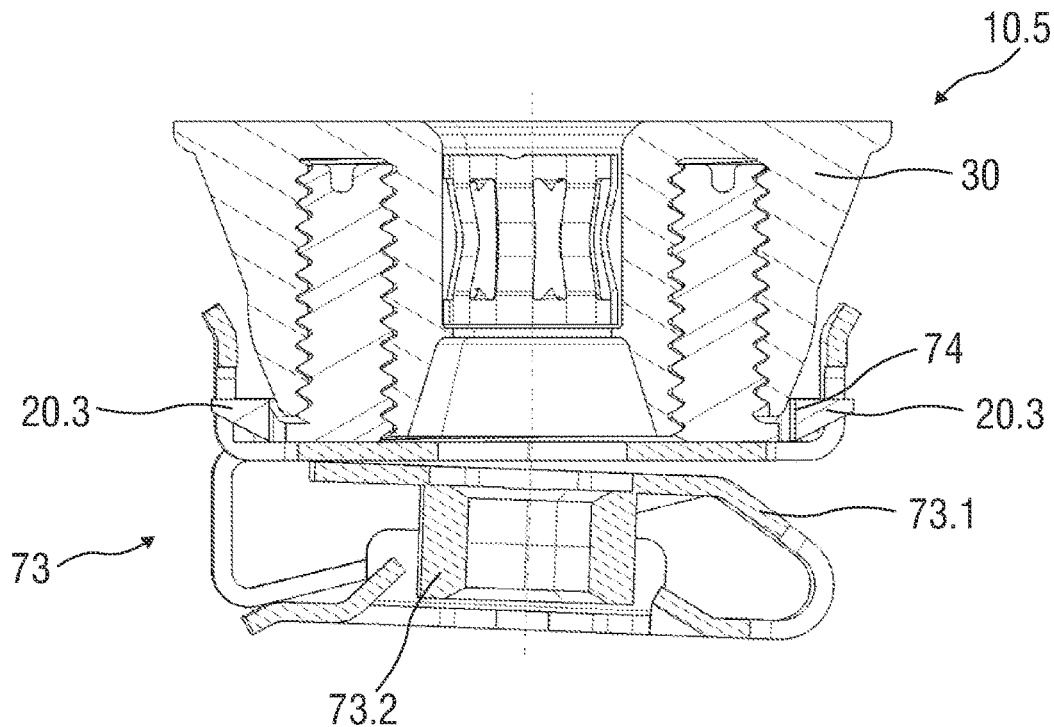

FIG. 15 schematically shows a sectional representation of the device 10.5 according to FIG. 14.

Figure 16:
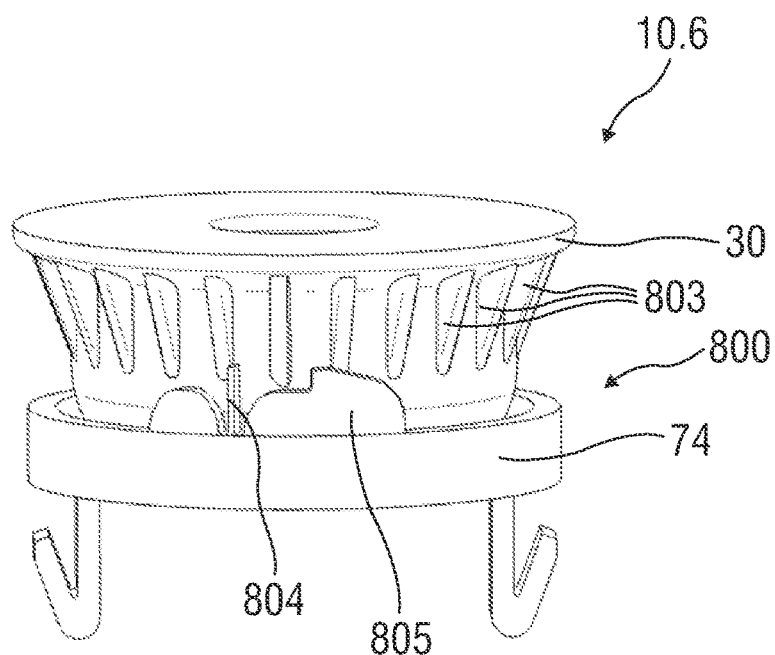

FIG. 16 shows a schematic perspective view of a seventh exemplary embodiment of a device 10.6 for compensating for tolerances between two components B1, B2 to be joined together. The device 10.6 differs from the previous examples in the type of the securing arrangement 80 or 800 designed as a transport lock.

The securing arrangement 800 according to FIG. 16 comprises the ribs 803 on the compensating element 30 and engaging elements 804, 805 axially protruding from the fastening ring 74. The engaging element 804 is designed as an axially protruding bar. The engaging element 805 can also be designed as a radial stop.

Figure 17:
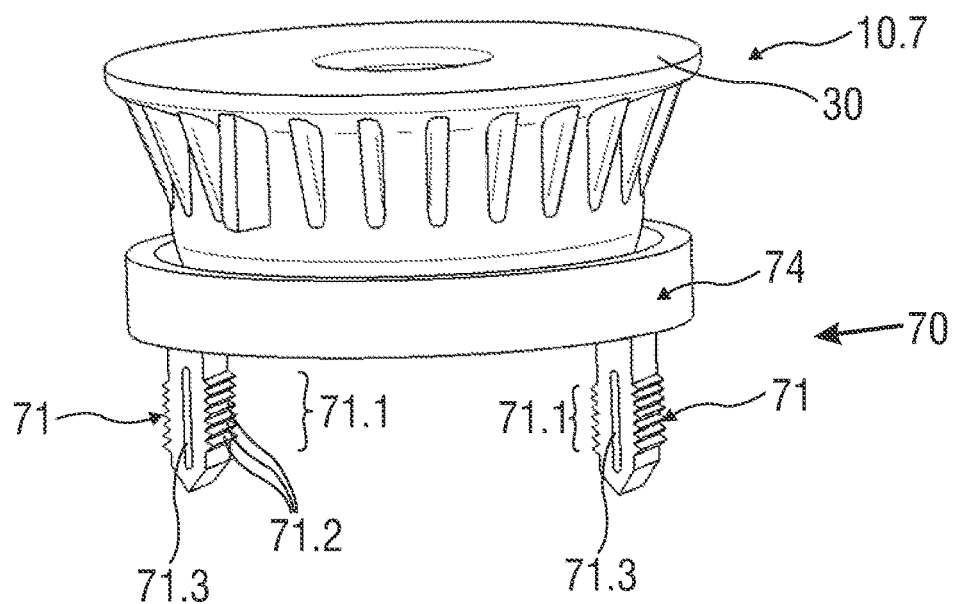

FIG. 17 shows a schematic perspective view of an eighth exemplary embodiment of a device 10.7 for compensating for tolerances between two components B1, B2 to be joined together.

The device 10.7 differs only in the shape of holding arms 71 protruding from the fastening ring 74. Instead of a holding hook as in FIGS. 1 to 5, 8 to 12, 13, 16, the holding arms 71 comprise latching sections 71.1 with a row of latching teeth 71.2. For easier latching, the holding arms 71 are designed to be flexible. For example, the holding arms 71 have a hollow slot 71.3.

Figure 18:
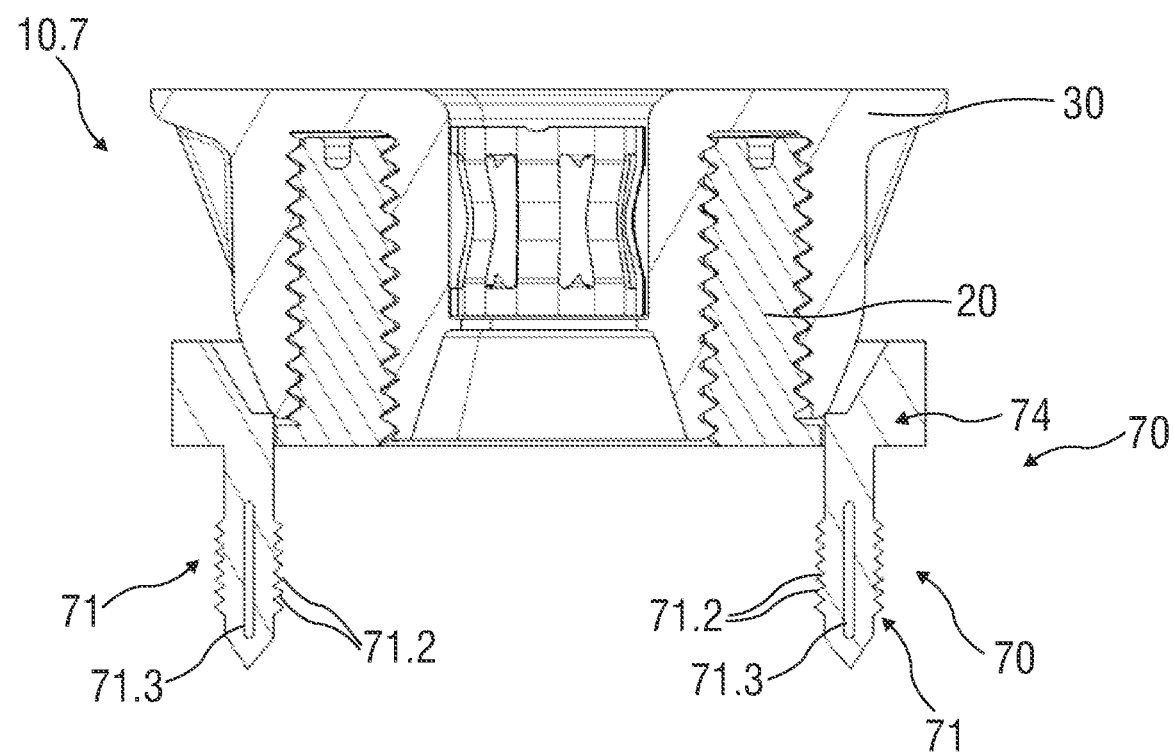

FIG. 18 schematically shows a sectional representation of the device 10.7 according to FIG. 17.

LIST OF REFERENCE SIGNS 10.x, 10, 10.1 to 10.5 Device
20 Base element
20.1, 20.2 Coupling space
20.3 Clamping noses
21 Inner ring
22 Outer ring
23 Contact section
30 Compensating element
31 Inner ring
32 Outer ring
33 Contact section
34 Bevel
40 Screw element
50 Driving element
50.1 Expansion body
50.2 Nose
50.3 Recess
50.4 Longitudinal slot
61 to 63 Coupling interface
611 to 632 Threads
641, 642 Sliding section
70 Holding device
71 Holding arm
71.1 Latching section
71.2 Latching tooth
71.3 Hollow slot
72 Cutout
73 Clamping unit
73.1 Clamping clip
73.2 Nut element
74 Fastening ring
80, 800 Securing arrangement
81, 82, 801, 802 Securing element
803 Rib
83 End stop
90, 91 End stop
B1, B2 Component H1, H2 Cavity
S1, S2 End face
P1 Starting position
P2 Compensating position
R Direction

The invention claimed is:

1. A device for compensating for tolerances between two components to be connected to one another, comprising:
   a base element,
   a compensating element which is in threaded engagement with the base element and which can be moved from a starting position by rotation relative to the base element,
   a radially yielding driving element acting in a predetermined direction, and
   a holding device for connecting to one of the components, wherein the holding device is designed as an integrated part of the base element or the compensating element, or as a separate part and can be detachably arranged on one of the components in a form-fitting and/or force-fitting manner, and
   wherein the base element and the compensating element are nested in such a way that at least two coupling interfaces are formed between the base element and the compensating element
   wherein said driving element is symmetrical about a vertical axis.

2. The device according to claim 1, wherein the driving element is designed as a radially expanding expansion body.

3. The device according to claim 1, wherein the driving element is completely accommodated by a cavity in the compensating element.

4. The device according to claim 3, wherein the cavity in which the driving element is completely accommodated comprises a constant inner diameter.

5. The device according to claim 1, wherein the driving element comprises a number of radially outwardly projecting noses.

6. The device according to claim 5, wherein the driving element comprises laterally opposed lower noses and laterally opposed upper noses.

7. The device according to claim 1, wherein the coupling interfaces are radially spaced apart from each other.

8. The device according to claim 1, wherein the coupling interfaces are formed by a plurality of nested and axially movable threads of the base element and the compensating element.

9. The device according to claim 1, wherein the base element and the compensating element are each designed as double rings.

10. The device according to claim 1, wherein the compensating element has an outer ring which is provided with an internal thread and an external thread.

11. The device according to claim 1, wherein the compensating element has an inner ring which is provided with an external thread.

12. The device according to claim 1, wherein the base element has an outer ring which is provided with an internal thread.

13. The device according to claim 1, wherein the base element has an inner ring which is provided with an external thread and an internal thread.

14. The device according to claim 1, wherein a securing arrangement is provided for securing the compensating element against movement relative to the base element.

15. The device according to claim 14, wherein the securing arrangement is designed as a transport lock and comprises a number of outwardly protruding securing elements which are arranged on a peripheral side and/or an end face of the compensating element and the base element.

16. The device according to claim 1, wherein the at least one holding device is provided and configured to pre-mount the device on one of the components.

17. The device according to claim 1, wherein the holding device is arranged on the outer ring of the base element or on the compensating element.

18. The device according to claim 1, wherein the driving element is a spring.

19. The device according to claim 1, wherein the driving element comprises a through-opening with a width that is equal to a tolerance to be compensated.

* * * * *